(No Model.) 2 Sheets—Sheet 1.
F. BILLING, W. E. PARTRIDGE & W. S. MIDDLETON.
TOOL FOR GROOVING AND JOINING TUBES.
No. 601,230. Patented Mar. 29, 1898.
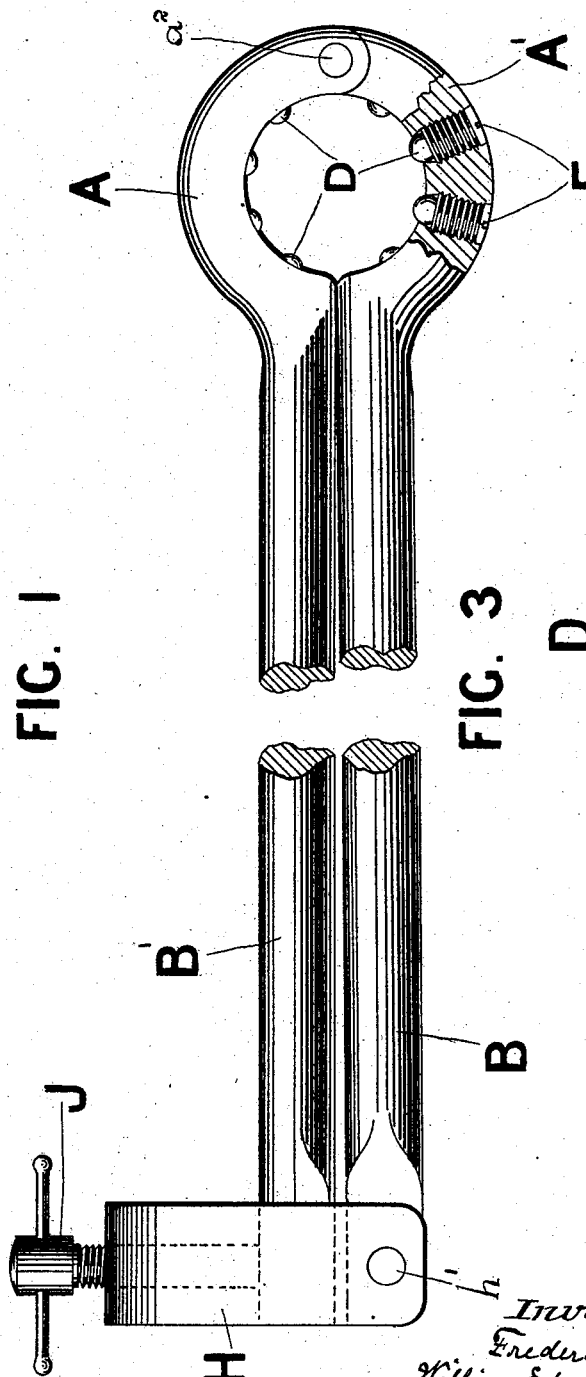
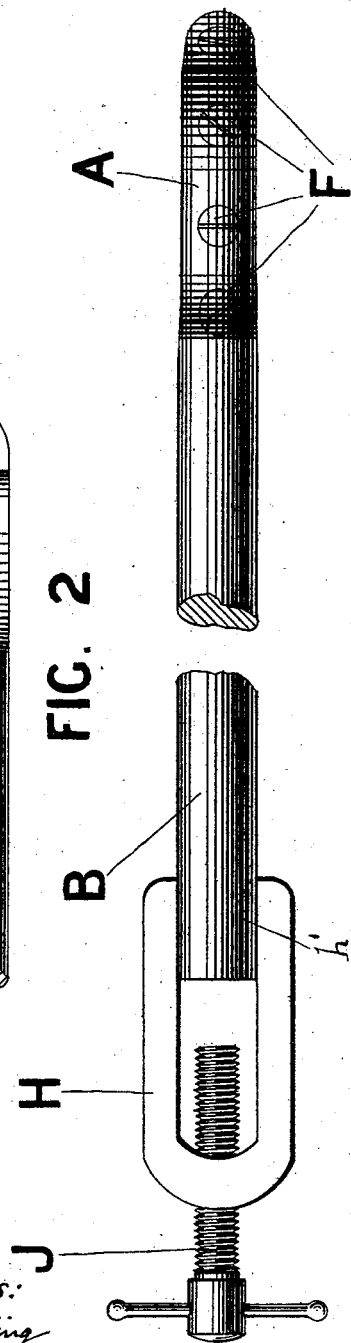

(No Model.) 2 Sheets—Sheet 2.
F. BILLING, W. E. PARTRIDGE & W. S. MIDDLETON.
TOOL FOR GROOVING AND JOINING TUBES.
No. 601,230. Patented Mar. 29, 1898.
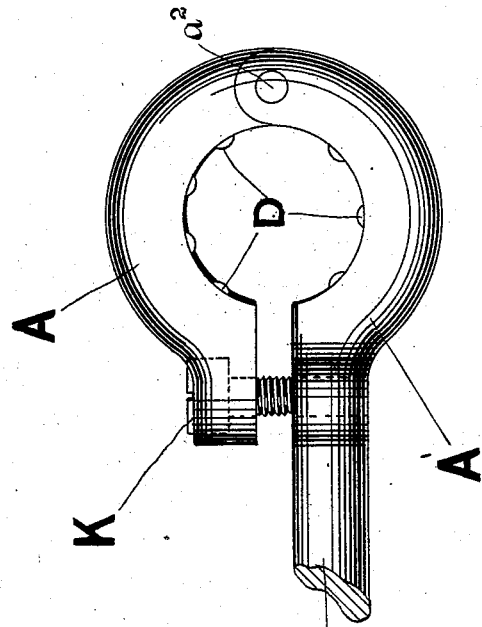
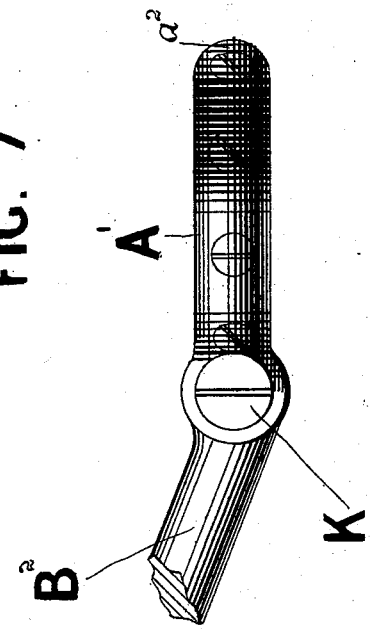
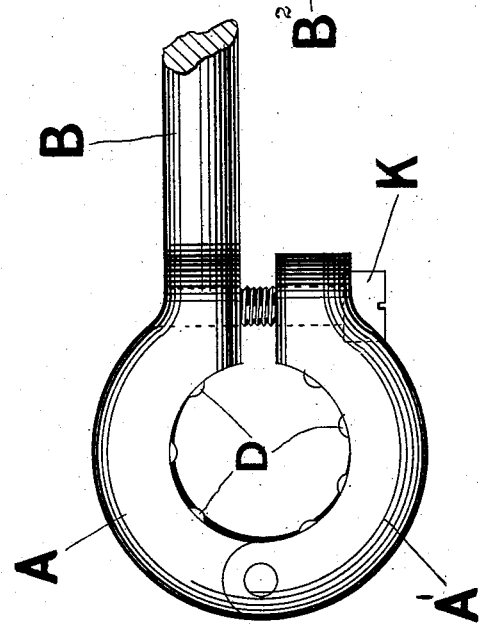
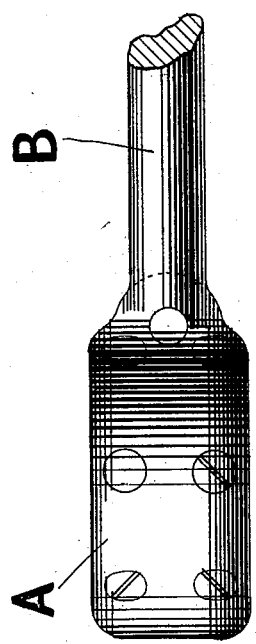
Witnesses:
E. B. Bolton
Inventors:
Frederick Billing
William Edward Partridge
William Samuel Middleton
By
their Attorneys.

UNITED STATES PATENT OFFICE.

FREDERICK BILLING, WILLIAM EDWARD PARTRIDGE, AND WILLIAM SAMUEL MIDDLETON, OF BIRMINGHAM, ENGLAND.

TOOL FOR GROOVING AND JOINING TUBES.

SPECIFICATION forming part of Letters Patent No. 601,230, dated March 29, 1898.

Application filed December 14, 1897. Serial No. 661,886. (No model.) Patented in England September 28, 1897, No. 22,200.

*To all whom it may concern:*

Be it known that we, FREDERICK BILLING, manufacturer, of Livery street, WILLIAM EDWARD PARTRIDGE, traveler, of 722 Coventry road, Small Heath, and WILLIAM SAMUEL MIDDLETON, manufacturer, of 21 to 23 Coleshill street, Birmingham, in the county of Warwick, England, subjects of the Queen of Great Britain, have invented a certain new and useful Improved Tool for Forming Grooves or Depressions in Making the Junctions of Cycle and Motor-Car Frames and for other Similar Purposes, of which the following is a specification.

Our invention has for its object a new or improved tool for forming grooves or depressions in making the junctions of cycle and motor-car frames and for other similar purposes.

This invention has been patented in England under date of September 28, 1897, No. 22,200.

We take two semicircular or curved pieces of steel or other suitable metal and hinge them to each other in such a manner as to form a nearly complete circle. One or both of the curved pieces may finish with a handle for operating the tool, or a handle may be hinged to it which will turn out of the way for convenience in handling the tool, so as to work it in confined positions. In the edge or back of these curved pieces we drill a number of holes in one, two, or more rows, of such a diameter as to be suitable to drop in a ball of suitable diameter to form the necessary groove or grooves required in forming the junctions. The point of the drill only penetrates sufficiently to allow the balls to project sufficiently to form the grooves without falling out. These balls are secured and tightened up by a separate screw set-pin behind each ball. This makes a compact and cheap tool for use in small shops.

In order that our invention may be more clearly understood and easily carried into practical effect, we have appended hereunto two sheets of drawings, upon which we have illustrated examples of our improved tool.

Figure 1 shows a complete view of our tool ready for use. Fig. 2 is an edge view of the same tool, shafts or handles broken and the locking or tightening arrangement open. Fig. 3 is an inside edge view of one of the jaws, showing the balls arranged so as to work around a spiral groove. Fig. 4 shows a modified form of our tool having two rows of balls and only one shaft or handle. Fig. 5 is an edge view of Fig. 4. Fig. 6 shows another modified form of tool with a single row of balls. Fig. 7 is an edge view of Fig. 6.

In carrying our invention into practice we take the two semicircular or curved pieces A and A', of steel or other suitable metal, having the shafts or handles B and B'. We then hinge these two semicircular pieces to each other at $a^2$, so as to form a complete or nearly complete circle. In the edge or back of each of the semicircular pieces we drill, say, four holes of such a diameter as to be suitable to drop in the balls D, which balls are of suitable diameter to form the necessary groove or grooves required in making the junctions. The point of the drill when forming these holes only protrudes sufficiently to allow a portion of each ball to project when inserted, as clearly shown at Figs. 1, 4, and 6. Each ball is held in position and adjusted by the separate screw set-pin F, which is secured into the hole after the ball has been inserted, the end of which forms a bearing-surface for the ball, and these ends may be cupped or hollowed, if necessary. For the purpose of holding the jaws or circular pieces A and A' more firmly around the junction when forming the grooves we secure the locking device H to the end of one of the shafts, which consists of the U-shaped clip H, pivoted at $h'$ to the shaft B. In the base or end of this clip we drill and tap a hole, in which we insert the screw-pin J. It will be readily understood that when this clip is turned so as to inclose the ends of both shafts or handles, as shown at Fig. 1, and the screw-pin tightened up, the end of this pin will bear against the end of the shaft B', thus forcing the two shafts together.

In the tool as shown at Fig. 3 we drill and tap the holes in which the balls are inserted so as to form a portion of a spiral, which enables the tool to be used with a junction in which spiral grooves are formed.

In the tool as shown at Figs. 4 and 5 we have provided a double row of balls, so as to form two grooves simultaneously, and we have also dispensed with one of the shafts or handles, and in the loose end of the part A' we form a hole for inserting the screwed pin K, which screws into a tapped hole in the part A, by which means the jaws are firmly held in position when forming the junction.

We may, if necessary, use more than two rows of balls either with a tool having one or two shafts or handles.

In the modification as shown at Figs. 6 and 7 we also dispense with one of the handles or shafts and tighten the jaws together by the screw-pin K. In this case we form the handle or shaft B² at an angle to the jaws, so as to enable the tool to be more conveniently used when making certain junctions, or the handle or handles or shaft or shafts may in all cases be hinged or pivoted to the jaws A and A', so as to enable them to turn out of the way for convenience in handling.

We claim—

1. A tool for forming grooves or depressions in tubes comprising the jaws pivoted together and having openings therein with contracted ends, balls seated in said openings, and means for holding the balls in proximity to said contracted ends, substantially as described.

2. A tool for forming grooves or channels in tubes comprising the hinged jaws, openings therein having contracted ends, and screws threaded into the openings in the rear of the balls, substantially as described.

3. In combination, the hinged jaws having a plurality of openings arranged helically thereof, said openings having contracted ends, balls located in the openings, and bearing-seats for the balls in the rear thereof, substantially as described.

In testimony that we claim the foregoing as our own we affix our names in the presence of two witnesses.

FREDERICK BILLING.
WILLIAM EDWARD PARTRIDGE.
WILLIAM SAMUEL MIDDLETON.

Witnesses:
GEORGE LESTER,
E. S. FRIEND.